United States Patent
Kasada et al.

(10) Patent No.: US 10,026,435 B2
(45) Date of Patent: *Jul. 17, 2018

(54) MAGNETIC TAPE HAVING CONTROLLED SURFACE PROPERTIES OF THE BACKCOAT LAYER AND METHOD OF MANUFACTURING THE SAME

(71) Applicant: FUJIFILM Corporation, Tokyo (JP)

(72) Inventors: Norihito Kasada, Minami-ashigara (JP); Masahito Oyanagi, Minami-ashigara (JP); Toshio Tada, Minami-ashigara (JP); Takuro Sugiyama, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/241,631

(22) Filed: Aug. 19, 2016

(65) Prior Publication Data

US 2017/0053671 A1     Feb. 23, 2017

(30) Foreign Application Priority Data

Aug. 21, 2015   (JP) .................................. 2015-164162

(51) Int. Cl.
| | | |
|---|---|---|
| *G11B 5/78* | (2006.01) | |
| *G11B 5/70* | (2006.01) | |
| *G11B 5/735* | (2006.01) | |
| *G11B 5/842* | (2006.01) | |

(52) U.S. Cl.
CPC .................. *G11B 5/78* (2013.01); *G11B 5/70* (2013.01); *G11B 5/735* (2013.01); *G11B 5/842* (2013.01)

(58) Field of Classification Search
None
See application file for complete search history.

(56) References Cited

U.S. PATENT DOCUMENTS

| | | | | |
|---|---|---|---|---|
| 4,825,317 A | * | 4/1989 | Rausch | ................. G11B 15/58 360/128 |
| 8,535,817 B2 | * | 9/2013 | Imaoka | .................... G11B 5/70 428/844 |
| 2011/0052908 A1 | | 3/2011 | Imaoka | |
| 2017/0053669 A1 | * | 2/2017 | Kasada | .................... G11B 5/78 |

(Continued)

FOREIGN PATENT DOCUMENTS

| | | |
|---|---|---|
| JP | 63-249932 A | 10/1988 |
| JP | 64-060819 A | 3/1989 |

(Continued)

OTHER PUBLICATIONS

Derwent Abstract of JP 2002-367318 A (Year: 2002).*

(Continued)

*Primary Examiner* — Kevin M Bernatz
(74) *Attorney, Agent, or Firm* — Sughrue Mion, PLLC

(57) ABSTRACT

The magnetic tape has a magnetic layer containing ferromagnetic powder and binder on the surface on one side of a nonmagnetic support and has a backcoat layer containing nonmagnetic powder and binder on the surface on the other side of the nonmagnetic support, wherein the backcoat layer is less than or equal to 0.30 μm in thickness; and the logarithmic decrement as determined by a pendulum viscoelasticity test on the surface on the backcoat layer side of the magnetic tape is less than or equal to 0.060.

15 Claims, 4 Drawing Sheets

(56) References Cited

U.S. PATENT DOCUMENTS

| | | | | |
|---|---|---|---|---|
| 2017/0053670 A1* | 2/2017 | Oyanagi | ................ | G11B 5/70 |
| 2017/0178675 A1* | 6/2017 | Kasada | ................... | G11B 5/68 |
| 2017/0372727 A1* | 12/2017 | Kasada | ............. | G11B 5/00813 |
| 2017/0372737 A1* | 12/2017 | Oyanagi | ............ | G11B 5/00813 |
| 2018/0061447 A1* | 3/2018 | Kasada | ................... | G11B 5/78 |

FOREIGN PATENT DOCUMENTS

| | | | |
|---|---|---|---|
| JP | 64-60819 A | | 3/1989 |
| JP | 2002367318 A | * | 12/2002 |

OTHER PUBLICATIONS

Office Action dated Oct. 5, 2017 from the United States Patent and Trademark Office in copending U.S. Appl. No. 15/378,907.
Office Action dated Oct. 5, 2017 from the United States Patent and Trademark Office in copending U.S. Appl. No. 15/241,297.
Office Action dated Oct. 5, 2017 from the United States Patent and Trademark Office in copending U.S. Appl. No. 15/241,286.

* cited by examiner

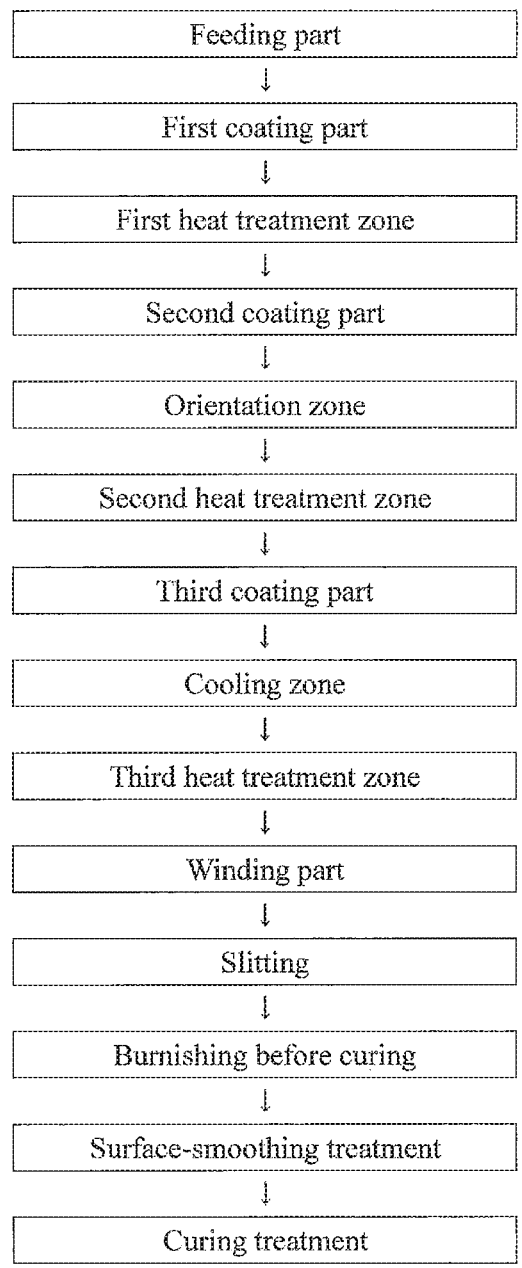

MAGNETIC TAPE HAVING CONTROLLED SURFACE PROPERTIES OF THE BACKCOAT LAYER AND METHOD OF MANUFACTURING THE SAME

CROSS-REFERENCE TO RELATED APPLICATIONS

This application claims priority under 35 U.S.C 119 to Japanese Patent Application No. 2015-164162 filed on Aug. 21, 2015. The above application is hereby expressly incorporated by reference, in its entirety.

BACKGROUND OF THE INVENTION

Field of the Invention

The present invention relates to a magnetic tape and a method of manufacturing the same.

Discussion of the Background

Magnetic recording media include tape-shaped media and disk-shaped media. Magnetic recording media in the form of tapes, that is, magnetic tapes, are primarily employed in storage applications such as data backup.

Magnetic tapes have been disclosed that have a backcoat layer (referred to as a "back layer" in Japanese Unexamined Patent Publication (KOKAI) Showa No. 63-249932 and Japanese Unexamined Patent Publication (KOKAI) Heisei No. 1-60819, which are expressly incorporated herein by reference in their entirety) on the opposite surface of a nonmagnetic support from the surface on which a magnetic layer is present.

SUMMARY OF THE INVENTION

A magnetic tape is housed wound up on a reel within a magnetic tape cartridge. To increase the recording capacity per magnetic tape cartridge, it is better to increase the overall length of the magnetic tape that is housed per cartridge. To that end, it is desirable to reduce the thickness (also referred to as "thickness reduction" hereinafter) of the magnetic tape.

An example of one way to reduce the thickness of a magnetic tape is to reduce the thickness of the backcoat layer. Japanese Unexamined Patent Publication (KOKAI) Showa No. 63-249932 describes the thickness of the backcoat layer as being less than or equal to 2.5 μm (Japanese Unexamined Patent Publication (KOKAI) Showa No. 63-249932, Claim 1), with the thickness of the backcoat layer in Examples being 2.0 μm. Japanese Unexamined Patent Publication (KOKAI) Heisei No. 1-60819 describes the thickness of the backcoat layer as being less than or equal to 1.5 μm (Japanese Unexamined Patent Publication (KOKAI) Heisei No. 1-60819, Claim 1), with the thickness of the backcoat layer in Examples being 1.0 μm. However, since the achievement of even higher recording capacities has been called for in recent years, it is desirable to further reduce the thickness of the backcoat layer (also referred to as "layer thickness reduction" hereinafter).

However, the present inventors examined reducing the thickness of the backcoat layer. As a result, they determined that particularly with a magnetic tape having a thin backcoat layer less than or equal to 0.30 μm in thickness, partial drops in reproduction signal amplitude (referred to as "missing pulses") frequently occurred in the course of reproducing signals recorded on the tape. The higher the frequency of occurrence of the missing pulses, the greater the error rate, finally compromising the reliability of the magnetic tape. It is thus desirable to reduce the frequency of occurrence of missing pulses.

An aspect of the present invention provides for a magnetic tape having a backcoat layer the thickness of which has been reduced to less than or equal to 0.30 μm, in which the frequency of occurrence of missing pulses has been reduced.

An aspect of the present invention relates to a magnetic tape having a magnetic layer containing ferromagnetic powder and binder on the surface on one side of a nonmagnetic support and having a backcoat layer containing nonmagnetic powder and binder on the surface on the other side of the nonmagnetic support, wherein:

the backcoat layer is less than or equal to 0.30 μm in thickness; and the logarithmic decrement as determined by a pendulum viscoelasticity test on the surface on the backcoat layer side of the magnetic tape is less than or equal to 0.060.

The above magnetic tape can permit a reduction in the frequency of occurrence of missing pulses despite having a backcoat layer with a thickness that has been reduced to less than or equal to 0.30 μm. The presumptions of the present inventors in this regard will be given further below.

In one embodiment, the logarithmic decrement is greater than or equal to 0.010 but less than or equal to 0.060.

In one embodiment, the logarithmic decrement is greater than or equal to 0.010 but less than or equal to 0.050.

In one embodiment, the nonmagnetic powder that is contained in the backcoat layer is selected from the group consisting of carbon black and nonmagnetic inorganic oxide powder. The term "nonmagnetic powder" means an aggregation of multiple nonmagnetic particles. The term "aggregation" is not limited to forms in which the particles constituting the aggregation are in direct contact, but also includes forms in which binder, additives, and the like are present between the particles. The term "particles" is also sometimes used to denote powder. The above points also apply to the various powders referred to in the present invention and present specification.

In one embodiment, the above magnetic tape has a nonmagnetic layer containing nonmagnetic powder and binder between the magnetic layer and the nonmagnetic support.

A further aspect of the present invention relates to a method of manufacturing the above magnetic tape, including forming a backcoat layer, with the forming of a backcoat layer including:

coating a backcoat layer-forming composition containing nonmagnetic powder, binder, a curing agent, and solvent on the surface of a nonmagnetic support to form a coating layer;

heating and drying the coating layer by a heat treatment; and curing the coating layer by subjecting the coating layer to a curing treatment;

with cooling the coating layer after the coating but before the heating and drying; and burnishing the surface of the coating layer after the heating and drying but before the curing.

In one embodiment, the cooling is conducted by placing the coating layer in a cooling atmosphere of −10° C. to 0° C.

In one embodiment, the solvent contained in the backcoat layer-forming composition contains ketone solvent.

In one embodiment, the curing agent is a thermosetting compound and the curing is conducted by a heat treatment.

In one embodiment, the thermosetting compound is polyisocyanate.

An aspect of the present invention can provide a magnetic tape having a backcoat layer that is less than or equal to 0.30 μm in thickness in which the frequency of occurrence of missing pulses is reduced.

Other exemplary embodiments and advantages of the present invention may be ascertained by reviewing the present disclosure and the accompanying drawing(s).

BRIEF DESCRIPTION OF THE DRAWINGS

The present invention will be described in the following text by the exemplary, non-limiting embodiments shown in the drawing, wherein:

FIG. 4 is an example (process schematic) of a specific form of the magnetic tape manufacturing process.

DETAILED DESCRIPTION OF THE EMBODIMENTS

Figure 1:
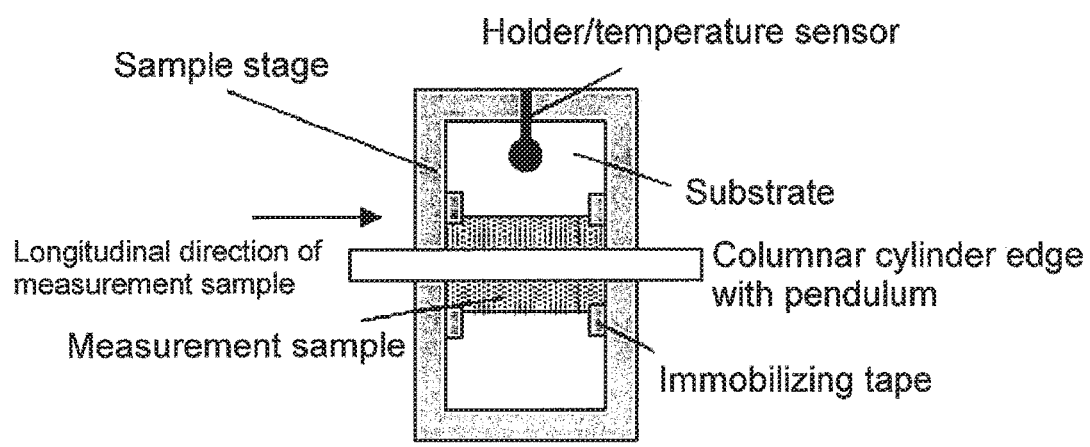
FIG. 1 is a descriptive drawing of the method of measuring the logarithmic decrement.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

An aspect of the present invention relates to a magnetic tape having a magnetic layer containing ferromagnetic powder and binder on the surface on one side of a nonmagnetic support and having a backcoat layer containing nonmagnetic powder and binder on the surface on the other side of the nonmagnetic support, wherein the thickness of the backcoat layer is less than or equal to 0.30 μm and the logarithmic decrement as determined by a pendulum viscoelasticity test on the surface on the backcoat layer side of the magnetic tape (also referred to simply as the "logarithmic decrement" hereinafter) is less than or equal to 0.060.

The above magnetic tape will be described in greater detail below.

[Thickness of the Backcoat Layer]

The thickness of the backcoat layer of the above magnetic tape is less than or equal to 0.30 μm, desirably 0.10 μm to 0.30 μm, from the perspective of reducing the thickness of the backcoat layer.

The thickness of the various layers and nonmagnetic support of the magnetic tape, as well as the total thickness, can be determined by known film thickness measurement methods. As an example, the cross section of the magnetic tape in the direction of thickness can be exposed by a known method such as an ion beam or microtome, and the exposed cross section can be observed by a scanning electron microscope. The various thicknesses can be determined as the thickness determined at one spot in the direction of thickness, or as the arithmetic average of the thicknesses obtained at multiple spots, such as two or more randomly extracted spots. The thickness of the various layers can also be determined as the design thickness calculated from the manufacturing conditions.

[Logarithmic Decrement]

The logarithmic decrement as determined by a pendulum viscoelasticity test on the surface of the magnetic tape on the side of the backcoat layer is less than or equal to 0.060. This makes it possible to reduce the frequency of occurrence of missing pulses in the course of reproducing a signal that has been recorded on a magnetic tape having a backcoat layer the thickness of which has been reduced to less than or equal to 0.30 μm. From the perspective of further reducing the frequency of occurrence of missing pulses, the logarithmic decrement is desirably less than or equal to 0.058, preferably less than or equal to 0.055, more preferably less than or equal to 0.054, and still more preferably, less than or equal to 0.050. Additionally, from the perspective of reducing the frequency of occurrence of missing pulses, since the lower the logarithmic decrement the better, no lower limit is established. For example, the logarithmic decrement can be greater than or equal to 0.010 or greater than or equal to 0.015, or can fall below these. Specific means of adjusting the logarithmic decrement will be described further below.

In the present invention and present specification, the term "logarithmic decrement" is a value determined by the following method.

Figure 2:
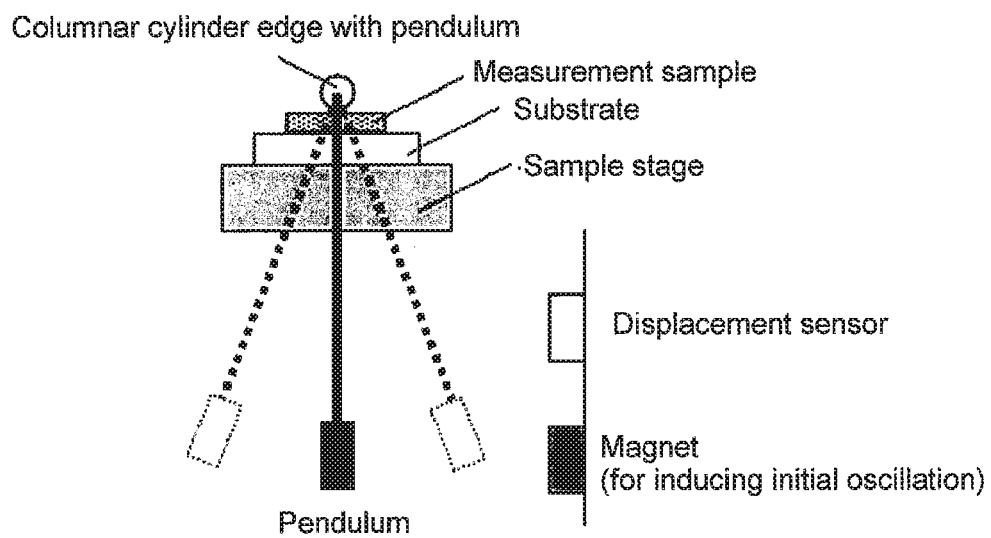
FIG. 2 is a descriptive drawing of the method of measuring the logarithmic decrement.
Figure 3:
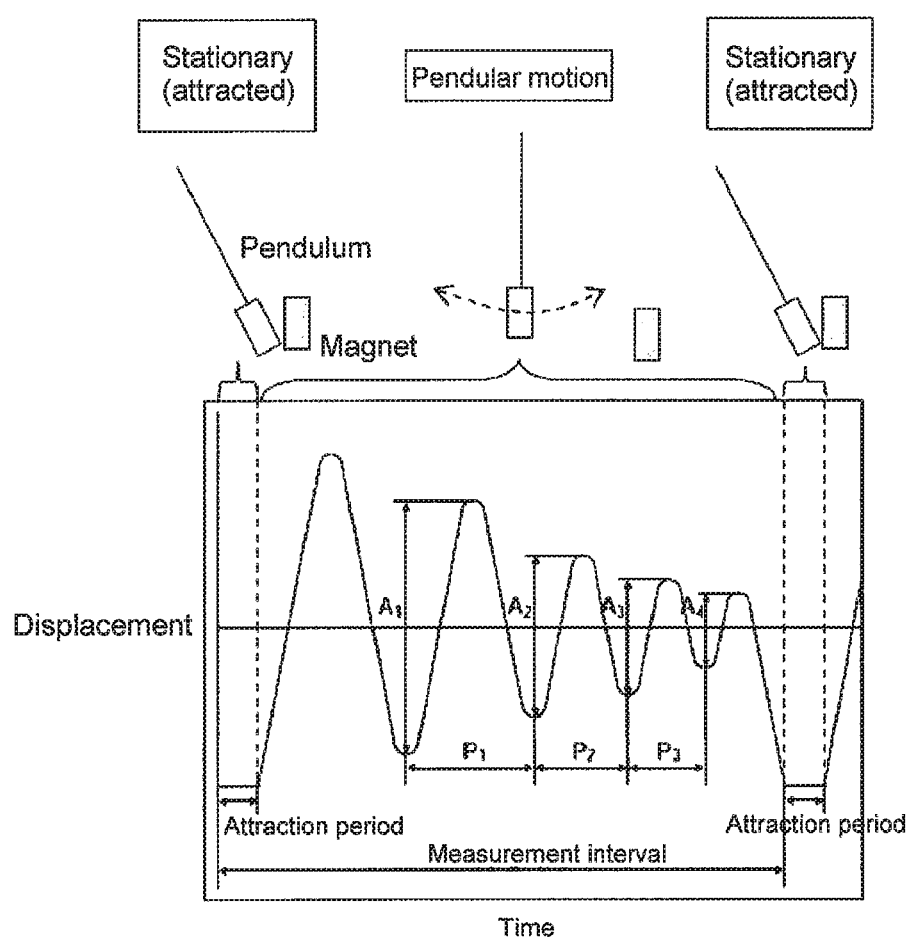
FIG. 3 is a descriptive drawing of the method of measuring the logarithmic decrement.

FIGS. 1 to 3 are descriptive drawings of the method of measuring the logarithmic decrement. The method of measuring the logarithmic decrement will be described below with reference to these figures. However, the forms shown in the figures are examples, and do not limit the present invention in any way.

A measurement sample is cut out of the magnetic tape to be measured. The measurement sample that has been cut out is placed with the measurement surface (surface on the backcoat layer side) facing upward on a substrate in a pendulum viscoelasticity tester, and is secured with immobilizing tape or the like in a state with no visibly apparent wrinkles.

The columnar cylinder edge (4 mm in diameter) equipped with a pendulum 13 g in weight is disposed on the measurement surface of the measurement sample such that the long axis direction of the columnar cylinder edge runs parallel to the longitudinal direction of the measurement sample. An example of the columnar cylinder edge equipped with a pendulum positioned (as viewed from above) on the measurement surface of a measurement sample in this manner is shown in FIG. 1. In the form shown in FIG. 1, a holder/temperature sensor is positioned in a configuration permitting monitoring of the substrate surface temperature. However, this configuration is not essential. The longitudinal direction of the measurement sample refers to the longitudinal direction of the magnetic tape out of which the measurement sample has been cut. The angles such as "parallel" that are referred to in the present specification may include the range of error that is permitted in the technical field to which the present invention belongs. For example, they mean falling within a range of less than ±10° of the precise angle. The error relative to the precise angle is desirably less than or equal to 5°, preferably less than or equal to 3°. The pendulum employed is made of a material having the property of being drawn by a magnet, such as a metal, alloy, or the like.

The surface temperature of the substrate on which the measurement sample has been positioned is raised at a rate of less than or equal to 5° C./min (any rate of increase less than or equal to 5° C./min will do) up to 80° C., and movement of the pendulum is begun (initial oscillation is induced) by removing the attraction between pendulum and magnet. FIG. 2 shows an example of how the pendulum moves (a lateral view). In the form shown in FIG. 2, within the pendulum viscoelasticity tester, the passage of electricity to the magnetic (electromagnet) positioned beneath the sample stage is halted (the switch is turned off) to remove the attraction, thereby causing the pendulum to begin to move. When electricity is restored to the electromagnet (the switch is turned on), the pendulum is drawn by the magnetic, stopping movement of the pendulum. During movement of the pendulum, as shown in FIG. 2, the pendulum oscillates repeatedly. While the pendulum is oscillating repeatedly, the displacement of the pendulum is monitored by a displacement sensor. Based on the results obtained, a displacement-time curve is obtained by plotting the displacement on the Y-axis and time on the X-axis. FIG. 3 shows an example of a displacement-time curve. The correlation between the status of the pendulum and the displacement-time curve is schematically shown in FIG. 3. During a given measurement interval, stationary (attraction) and pendular motion are repeated. Using a displacement-time curve obtained for a measurement interval of greater than or equal to 10 minutes (any period greater than or equal to 10 minutes will do), the logarithmic decrement Δ (no unit) is obtained from the equation given below. The value obtained is adopted as the logarithmic decrement of the surface on the backcoat layer side of the magnetic tape. One attraction period is made greater than or equal to 1 second (any period greater than or equal to 1 second will do), and the period from the end of one attraction to the start of the next attraction is made greater than or equal to 6 seconds (any period greater than or equal to 6 seconds will do). The measurement interval refers to the interval from the start of one attraction to the start of the next attraction. The humidity of the environment in which pendular motion is conducted can be any relative humidity falling within a range of 40% to 70%.

In the displacement-time curve, the interval from one minimum displacement to the next minimum displacement is adopted as one wave period. The number of waves contained in the displacement-time curve during one measurement interval is denoted by n, and the difference between the minimum displacement and the maximum displacement of the $n^{th}$ wave is denoted by An. In FIG. 3, the interval from the minimum displacement of the $n^{th}$ wave to the next minimum is denoted as Pn (for example, $P_1$ for the 1st wave, $P_2$ for the second, $P_3$ for the third). The logarithmic decrement is calculated using the difference between the next minimum displacement and maximum displacement of the $n^{th}$ wave ($A_{n+1}$ in the above equation, $A_4$ in the displacement-time curve shown in FIG. 3). However, the portion during which the pendulum is stationary (attracted) following the maximum is not employed in counting the number of waves. Nor is the portion during which the pendulum is stationary (attracted) before the maximum displacement used to count the number of waves. Accordingly, in the displacement-time curve shown in FIG. 3, the number of waves is 3 (n=3).

The present inventors presume the following regarding the logarithmic decrement. However, the following description is merely a presumption and is not intended to limit the present invention in any way.

A magnetic tape is housed wound up on a reel within a magnetic tape cartridge. To record and reproduce a signal on a magnetic tape, the magnetic tape cartridge is placed in a drive, the magnetic tape is run within the magnetic tape cartridge, and the surface of the magnetic tape of the magnetic layer side is caused to come into sliding contact with a magnetic head (also referred to hereinafter simply as a "head"). Since the magnetic tape is stored wound up on a reel in the magnetic tape cartridge, the magnetic tape is fed out from the reel and wound up during running. The surface on the magnetic layer side of the wound up magnetic tape comes into contact with the surface on the backcoat layer side. In a magnetic tape having a backcoat layer the thickness of which has been reduced to less than or equal to 0.30 μm, during this contact, components derived from the backcoat layer tend to transfer to the surface on the magnetic layer side. The present inventors presume that the transferred components adhere to the head and accumulate with repeated running, tending to cause missing pulses. The reason this transfer tends to occur has yet to be determined. However, the present inventors presume that reducing the thickness of the backcoat layer to less than or equal to 0.30 μm may reduce the stiffness (rigidity) of the backcoat layer.

Accordingly, the present inventors conducted further extensive research into how components derived from the backcoat layer were transferred to the surface of the magnetic tape on the magnetic layer side, and into how to reduce the quantity that then adhered to and accumulated on the head. As a result, they conceived the idea that the logarithmic decrement set forth above could serve as an indicator of the amount of components that had adhered to and accumulated on the head, and discovered that the occurrence of missing pulses could be suppressed by keeping this value to less than or equal to 0.060. The present inventors presume the components derived from the backcoat layer that are the cause of the missing pulses set forth above to be adhesive components that are released from the surface of the magnetic tape on the backcoat layer side. Although the details surrounding these adhesive components are unclear, the present inventors presume that they may be derived from the resins that are employed as binder. More particularly, various resins can be employed as set forth in detail further $$\Delta = \frac{\ln\left(\frac{A_1}{A_2}\right) + \ln\left(\frac{A_2}{A_3}\right) + \ldots \ln\left(\frac{A_n}{A_{n+1}}\right)}{n}$$

below as binders. The term "resin" refers to polymer of two or more polymerizable compounds (including homopolymer and copolymer), which normally also contains compounds the molecular weight of which falls below the average molecular weight (referred to as "low-molecular-weight binder components"). Such low-molecular-weight binder components are released on the surface of the magnetic tape on the backcoat layer side, and are transferred to the surface of the magnetic layer side during running. They subsequently adhere to the head and accumulate with repeated running, and the present inventors presume that they may cause the missing pulses. The low-molecular-weight binder components are presumed to have adhesive properties. The present inventors presume that the logarithmic decrement that is determined by a pendulum viscoelasticity test can be an indicator of the quantity of components that adhere to and accumulate on the head during running. In one embodiment, the backcoat layer is formed by coating a backcoat layer-forming composition, containing a curing agent in addition to nonmagnetic powder and binder, on a nonmagnetic support and subjecting it to a curing treatment. Here, the curing treatment causes the binder and curing agent to undergo a curing reaction (crosslinking reaction). However, the present inventors presume that the low-molecular-weight binder, for reasons yet to be established, is poor in reactivity to the curing reaction. Thus, the low-molecular-weight binder component tends not to remain in the backcoat layer, is released from the backcoat layer, and tends to be transferred to the surface of the magnetic tape on the magnetic layer side. The present inventors presume this to be one reason why low-molecular-weight binder components tend to adhere to and accumulate on the head from the surface on the magnetic layer side of the magnetic tape during running.

However, this is merely a presumption by the present inventors and is not intended to limit the present invention in any way.

The above magnetic tape will be described in detail below.

[Magnetic Layer]

<Ferromagnetic Powder>

The magnetic layer contains ferromagnetic powder and binder. Various powders that are commonly employed as ferromagnetic powder in the magnetic layers of magnetic recording media such as magnetic tapes can be employed as the ferromagnetic powder. The use of ferromagnetic powder of small average particle size is desirable from the perspective of enhancing the recording density of the magnetic tape. To that end, the ferromagnetic powder with an average particle size of less than or equal to 50 nm is desirably employed. From the perspective of the stability of magnetization, the ferromagnetic powder with an average particle size of greater than or equal to 10 nm is desirably employed.

The average particle size of the ferromagnetic powder is a value measured with a transmission electron microscope by the following method.

Ferromagnetic powder is photographed at a magnification of 100,000-fold with a transmission electron microscope, and the photograph is printed on print paper at a total magnification of 500,000-fold to obtain a photograph of the particles constituting the ferromagnetic powder. A target particle is selected from the photograph of particles that has been obtained, the contour of the particle is traced with a digitizer, and the size of the (primary) particle is measured. The term "primary particle" refers to an unaggregated, independent particle.

The above measurement is conducted on 500 randomly extracted particles. The arithmetic average of the particle size of the 500 particles obtained in this manner is adopted as the average particle size of the ferromagnetic powder. A Model H-9000 transmission electron microscope made by Hitachi can be employed as the above transmission electron microscope, for example. The particle size can be measured with known image analysis software, such as KS-400 image analysis software from Carl Zeiss.

In the present invention and the present specification, the average particle size of the powder, such as ferromagnetic powder and various kinds of powder, is the average particle size as obtained by the above method, unless otherwise stated. The average particle size indicated in Examples further below was obtained using a Model H-9000 transmission electron microscope made by Hitachi and KS-400 image analysis software made by Carl Zeiss.

The method described in paragraph 0015 of Japanese Unexamined Patent Publication (KOKAI) No. 2011-048878, which is expressly incorporated herein by reference in its entirety, for example, can be employed as the method of collecting sample powder such as ferromagnetic powder from a magnetic layer for particle size measurement.

In the present invention and the present specification, the size of the particles constituting powder such as ferromagnetic powder (referred to as the "particle size", hereinafter) is denoted as follows based on the shape of the particles observed in the above particle photograph:

(1) When acicular, spindle-shaped, or columnar (with the height being greater than the maximum diameter of the bottom surface) in shape, the particle size is denoted as the length of the major axis constituting the particle, that is, the major axis length.

(2) When platelike or columnar (with the thickness or height being smaller than the maximum diameter of the plate surface or bottom surface) in shape, the particle size is denoted as the maximum diameter of the plate surface or bottom surface.

(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of a powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

Ferromagnetic hexagonal ferrite powder is a specific example of desirable ferromagnetic powder. From the perspectives of achieving higher density recording and magnetization stability, the average particle size (for example, average plate diameter) of ferromagnetic hexagonal ferrite powder desirably ranges from 10 nm to 50 nm, preferably 20 nm to 50 nm. Reference can be made to Japanese Unexamined Patent Publication (KOKAI) No. 2011-225417, paragraphs 0012 to 0030, Japanese Unexamined Patent Publication (KOKAI) No. 2011-216149, paragraphs 0134 to 0136, and Japanese Unexamined Patent Publication (KOKAI) No. 2012-204726, paragraphs 0013 to 0030, for details on ferromagnetic hexagonal ferrite powder. The contents of the above publications are expressly incorporated herein by reference in their entirety.

Ferromagnetic metal powder is also a specific example of desirable ferromagnetic powder. From the perspectives of achieving higher density recording and magnetization stability, the average particle size (for example, average major axis length) of ferromagnetic metal powder desirably ranges from 10 nm to 50 nm, preferably 20 nm to 50 nm. Reference can be made to Japanese Unexamined Patent Publication (KOKAI) No. 2011-216149, paragraphs 0137 to 0141, and Japanese Unexamined Patent Publication (KOKAI) No. 2005-251351, paragraphs 0009 to 0023, for details on ferromagnetic metal powder. The contents of the above publications are expressly incorporated herein by reference in their entirety.

The content (fill rate) of ferromagnetic powder in the magnetic layer desirably falls within a range of 50 weight % to 90 weight %, preferably within a range of 60 weight % to 90 weight %. A high fill rate is desirable from the perspective of increasing recording density.

<Binder, Curing Agent>

The above magnetic tape is a particulate magnetic tape. The magnetic layer contains ferromagnetic powder and binder. The various resins that are commonly employed as binders in particulate magnetic recording media can be employed as the binder. Examples of binders are: polyurethane resin, polyester resin, polyamide resin, vinylchloride resin, styrene, copolymerized acrylic resin of acrylonitrile, methyl methacrylate, and the like; nitrocellulose and other cellulose resin; epoxy resin; phenoxy resin; and polyvinyl acetal, polyvinyl butyral, and other polyvinyl alkyral resin. These can be employed singly, or multiple resins can be mixed for use. Of these, polyurethane resin, acrylic resin, cellulose resin, and vinylchloride resin are desirable. These resins can also be employed as binders in the backcoat layer described further below and in the nonmagnetic layer that can be provided. Reference can be made to Japanese Unexamined Patent Publication (KOKAI) No. 2010-24113, paragraphs 0028 to 0031, with regard to these resins. The content of the above publication is expressly incorporated herein by reference in its entirety. The average molecular weight of resins that are employed as binders is, by way of example, greater than or equal to 10,000 and less than or equal to 200,000 as a weight average molecular weight. The weight average molecular weight in the present invention and present specification is a value that is obtained by measurement by gel permeation chromatography (GPC) and converted to a polystyrene equivalent. Examples of measurement conditions are given below. The weight average molecular weights given in Examples further below are values obtained by measurement under the following measurement conditions and converted to polystyrene equivalents.

GPC device: HLC-8120 (made by Tosoh Corp.)
Column: TSK gel Multipore HXL-M (7.8 mm inner diameter (ID)×30.0 cm, made by Tosoh Corp.)
Eluent: Tetrahydrofuran (THF)

A curing agent can be employed along with the above resins employed as binders. The curing agent can be a thermosetting compound—a compound in which a curing reaction (crosslinking reaction) progresses when heated—in one embodiment. In another embodiment, the curing agent can be a photo-curable compound—a compound in which a curing reaction (crosslinking reaction) progresses when irradiated with light. Thermosetting compounds are desirable as curing agents; polyisocyanate is suitable. Reference can be made to Japanese Unexamined Patent Publication 2011-216149, paragraphs 0124 and 0125, for details regarding polyisocyanate. In the magnetic layer-forming composition, the curing agent can be employed, for example, in a quantity of 0 to 80.0 weight parts per 100.0 weight parts of binder. From the perspective of enhancing coating strength, a curing agent can be added in a quantity of 50.0 to 80.0 weight parts for use.

<Additives>

As needed, one or more additives can be incorporated into a magnetic layer containing ferromagnetic powder and binder. Examples of additives are the above curing agents. At least a portion of the curing agent can be incorporated into the magnetic layer in a state of having reacted (having crosslinked) with another component such as binder by causing a curing reaction to progress in the magnetic layer-forming process. This point also applies to the formation of layers using the compositions employed to form other layers, such as the backcoat layer-forming composition, when these compositions contain a curing agent. Examples of additives that can be incorporated into the magnetic layer are nonmagnetic fillers, dispersing agents, dispersion adjuvants, antifungal agents, antistatic agents, oxidation inhibitors, and carbon black. Examples of nonmagnetic fillers are nonmagnetic fillers that function as abrasives, and nonmagnetic fillers (such as nonmagnetic colloidal particles) that are capable of functioning as protrusion-forming agents that can form protrusions which suitably protrude from the surface of the magnetic layer. The additives can be employed in any quantity by suitably selecting commercial products based on the properties desired. As an example of an additive that can be employed in a magnetic layer containing an abrasive, the dispersing agent described in Japanese Unexamined Patent Publication (KOKAI) No. 2013-131285, paragraphs 0012 to 0022, can be employed to enhance the dispersion of abrasives. The content of the above publication is expressly incorporated herein by reference in its entirety.

The magnetic layer set forth above can be provided directly on the surface of the nonmagnetic support, or indirectly over a nonmagnetic layer. Details about the nonmagnetic layer and nonmagnetic support will be given further below.

[Nonmagnetic Layer]

The nonmagnetic layer will be described next. In the above magnetic tape, a magnetic layer can be present directly on the nonmagnetic support, or a magnetic layer can be present over at least one other layer on the nonmagnetic support. This other layer is desirably a nonmagnetic layer containing nonmagnetic powder and binder. The nonmagnetic powder that is employed in the nonmagnetic layer can be an organic or an inorganic substance. Carbon black or the like can also be employed. Examples of inorganic materials are metals, metal oxides, metal carbonates, metal sulfates, metal nitrides, metal carbides, and metal sulfides. These nonmagnetic powders are available as commercial products and can be manufactured by known methods. Reference can be made to Japanese Unexamined Patent Publication (KOKAI) No. 2011-216149, paragraphs 0146 to 0150, for details. Reference can be made to Japanese Unexamined Patent Publication (KOKAI) No. 2010-24113, paragraphs 0040 and 0041, for details on carbon black that can be used in the nonmagnetic layer. The content (fill rate) of nonmagnetic powder in the nonmagnetic layer desirably falls within a range of 50 weight % to 90 weight %, preferably within a range of 60 weight % to 90 weight %.

Known techniques can be applied to the nonmagnetic layer with regard to the binder, additives, and other details relating to the nonmagnetic layer. For example, known techniques relating to the magnetic layer can be applied to the quantity and type of binder and the quantity and type of additives.

The nonmagnetic layer in the above magnetic tape may be in the form of an essentially nonmagnetic layer containing small quantities of ferromagnetic powder, either in the form of impurities or by intention, for example, along with nonmagnetic powder. In the present invention, the term "essentially nonmagnetic layer" refers to a layer with a residual magnetic flux density of less than or equal to 10 mT, a coercive force of less than or equal to 7.96 kA/m (100 Oe), or a layer with a residual magnetic flux density of less than or equal to 10 mT and a coercive force of less than or equal to 7.96 kA/m (100 Oe). The nonmagnetic layer desirably has neither residual magnetic flux density nor coercive force.

[Backcoat Layer]

A backcoat layer is present on the surface of the nonmagnetic support on the opposite side from that on which the magnetic layer is present. As set forth above, the thickness of the backcoat layer is less than or equal to 0.30 µm, and the logarithmic decrement, as determined by a pendulum viscoelasticity test on the surface of the magnetic tape on the side on which the backcoat layer is present, is less than or equal to 0.060. The backcoat layer contains nonmagnetic powder and binder, and can optionally contain known additives. Known techniques relating to backcoat layers can be applied regarding additional details such as the binder, additives, and the like of the backcoat layer. The backcoat layer can be formed by a curing step employing a backcoat layer-forming composition containing a curing agent. Those curing agents described above for use in the magnetic layer can be employed. The curing agent can be employed, for example, in a quantity of 0 to 80.0 weight parts, desirably 50.0 to 80.0 weight parts from the perspective of enhancing the coating strength, per 100.0 weight parts of binder in the backcoat layer-forming composition.

Reference can be made to the description of the nonmagnetic powder of the nonmagnetic layer set forth above with regard to the nonmagnetic powder of the backcoat layer. Examples of the nonmagnetic powder in the backcoat layer are either carbon black or a nonmagnetic inorganic powder other than carbon black, or both. Specific examples are nonmagnetic inorganic powders such as iron oxides such as α-oxide, titanium oxides such as titanium dioxide, cerium oxide, tin oxide, tungsten oxide, ZnO, $ZrO_2$, $SiO_2$, $Cr_2O_3$, α-alumina, β-alumina, γ-alumina, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide. Desirable nonmagnetic inorganic powders are nonmagnetic inorganic oxide powders, preferably α-iron oxide and titanium oxide, and more preferably, α-iron oxide.

The nonmagnetic powder other than carbon black can be acicular, spherical, polyhedral, or tabular in shape. The average particle size of these nonmagnetic powders desirably falls within a range of 0.005 µm to 2.00 µm, preferably within a range of 0.01 µm to 0.20 µm. The specific surface area (BET specific surface area) of the nonmagnetic powder by the Brunauer-Emmett-Teller (BET) method desirably falls within a range of 1 $m^2/g$ to 100 $m^2/g$, preferably 5 $m^2/g$ to 70 $m^2/g$, and more preferably, within a range of 10 $m^2/g$ to 65 $m^2/g$. The average particle size of the carbon black falls within a range of 5 nm to 80 nm, desirably 10 nm to 50 nm, and preferably, within a range of 10 nm to 40 nm. Reference can be made to the above description of nonmagnetic powder in the nonmagnetic layer with regard to the content (fill rate) of nonmagnetic powder in the backcoat layer. The content of carbon black falls, for example, within a range of 10.0 weight parts to 100.0 weight parts per 100.0 weight parts of the total quantity of nonmagnetic powder. The entire quantity of nonmagnetic powder can be in the form of carbon black. The entire quantity of nonmagnetic powder can also be in the form of a nonmagnetic powder other than carbon black.

[Nonmagnetic Support]

The nonmagnetic support will be described next. Known nonmagnetic supports in the form of biaxially stretched polyethylene terephthalate, polyethylene naphthalate, polyamide, polyamide-imide, aromatic polyamide, and the like are examples. Of these, polyethylene terephthalate, polyethylene naphthalate, and polyamide are desirable. These supports can be subjected in advance to treatments such as corona discharge, plasma treatments, adhesion-enhancing treatments, and heat treatments.

[Thickness of the Nonmagnetic Support, Thickness of the Various Layers]

The thickness of the nonmagnetic support and of the various layers in the above magnetic tape will be given below.

The thickness of the nonmagnetic support is desirably 3.00 µm to 4.50 µm.

The thickness of the magnetic layer can be optimized based on the saturation magnetization of the magnetic head employed, the length of the head gap, and the bandwidth of the recording signal, and it can be generally 0.01 µm to 0.15 µm (10 nm to 150 nm). From the perspective of higher density recording, it is desirably 0.02 µm to 0.12 µm (20 nm to 120 nm), preferably 0.03 µm to 0.10 µm (30 nm to 100 nm). It suffices for at least one magnetic layer to be present. It is also possible to divide the magnetic layer into two or more layers with differing magnetic characteristics. Known configurations of multilayer magnetic layers can be applied.

The thickness of the nonmagnetic layer is, for example, 0.01 µm to 3.00 µm, desirably 0.05 µm to 2.00 µm, and more preferably, 0.05 µm to 1.50 µm.

The thickness of the backcoat layer is as described above.

From the perspective of enhancing the recording capacity of the magnetic tape, it is desirable to reduce the thickness of the magnetic tape to increase the recording capacity per magnetic tape cartridge. In this regard, the total thickness of the magnetic tape is desirably less than or equal to 6.00 µm. From the perspective of the ease of handling (handling property) of the magnetic tape, the total thickness of the magnetic tape is desirably greater than or equal to 1.00 µm.

[Manufacturing Process]

<Preparation of the Various Layer-Forming Compositions>

The compositions for forming the magnetic layer, the backcoat layer, and the nonmagnetic layer that can be provided normally contain solvent in addition to the various components that have been set forth above. Examples of the solvent are the various organic solvents generally employed in the manufacturing of particulate magnetic recording media. Specific examples of solvents that can be employed are, in any proportions, acetone, methyl ethyl ketone, methyl isobutyl ketone, diisobutyl ketone, cyclohexanone, isophorone, tetrahydrofuran, and other ketones; methanol, ethanol, propanol, butanol, isobutyl alcohol, isopropyl alcohol, methyl cyclohexanol, and other alcohols; methyl acetate, butyl acetate, isobutyl acetate, isopropyl acetate, ethyl lactate, glycol acetate, and other esters; glycol dimethyl ether, glycol monoethyl ether, dioxane, and other glycol ethers; benzene, toluene, xylene, cresol, chlorobenzene, and other aromatic hydrocarbons; methylene chloride, ethylene chloride, carbon tetrachloride, chloroform, ethylene chlorohydrin, dichlorobenzene, and other chlorinated hydrocarbons; N,N-dimethylformamide; and hexanone. Of these, from the perspective of solubility of the binders commonly employed in particulate magnetic recording media, one or more ketone solvents are desirably incorporated into the backcoat layer-forming composition. The quantity of solvent in the backcoat layer-forming composition is not specifically limited. The quantity can be the usual quantity in the compositions for forming various layers of particulate magnetic recording media.

The description given above also applies to the solvents employed in the various layer-forming compositions, such as the magnetic layer-forming composition and the nonmagnetic layer-forming composition.

The process of preparing the compositions for forming the various layers normally includes at least a kneading step, a dispersion step, and mixing steps provided before and after these steps as needed. Each of these steps can be divided into two or more stages. All of the starting materials in the form of ferromagnetic powder, nonmagnetic powder, binder, various optionally added additives, solvent, and the like that are employed in the present invention can be added at the start, or part way through, any of these steps. An individual starting material can be divided for addition in two or more steps. By way of example, in preparing the magnetic layer-forming composition, it is desirable to separately disperse the composition containing the ferromagnetic powder (magnetic liquid) and the composition containing the abrasive (abrasive liquid). An open kneader, continuous kneader, pressurized kneader, extruder, or some other device with powerful kneading force is desirably employed in the kneading step. Details regarding these kneading processes are given in Japanese Unexamined Patent Publication (KOKAI) Heisei Nos. 1-106338 and 1-79274, which are expressly incorporated herein by reference in their entirety. Glass beads or some other form of bead can be employed to disperse the compositions for forming the various layers. High-density dispersion beads in the form of zirconia beads, titania beads, and steel beads are suitable as such dispersion beads. The particle diameter and fill rate of these dispersion beads can be optimized for use. A known disperser can be employed.

<Coating Step, Cooling Step, Heating and Drying Step, Burnishing Treatment Step, Curing Step>

The magnetic layer can be formed, for example, by multilayer coating, either sequentially or simultaneously, the magnetic layer-forming composition and the nonmagnetic layer-forming composition. Reference can be made to Japanese Unexamined Patent Publication (KOKAI) No. 2010-231843, paragraph 0066, for details on coatings to form the various layers. The content of the above publication is expressly incorporated herein by reference in its entirety.

In a desirable embodiment, the magnetic tape can be manufactured by sequential multilayer coating. The manufacturing process by sequential multilayer coating is desirably conducted as follows. The nonmagnetic layer is formed by a coating step of forming a coating layer by coating the nonmagnetic layer-forming composition on the surface of a nonmagnetic support and a heating and drying step of drying by means of a heat treatment the coating layer that has been formed. The magnetic layer is then formed by a coating step of coating a coating layer by coating the magnetic layer-forming composition on the surface of the nonmagnetic layer that has been formed, and a heating and drying step of drying by means of a heat treatment the coating layer that has been formed.

Additionally, the backcoat layer is formed on the surface of the nonmagnetic support on the opposite side from the surface on which the magnetic layer has been formed (or is to be formed). The backcoat layer is desirably formed by a coating step of forming a coating layer by coating the backcoat layer-composition on the surface of the nonmagnetic support, and a heating and drying step of drying by means of a heat treatment the coating layer that has been formed.

In one desirable embodiment, the above magnetic tape can be manufactured by a manufacturing method including a backcoat layer-forming process, where the backcoat layer-forming process includes:

a coating step of forming a coating layer by coating a backcoat layer-forming composition containing nonmagnetic powder, binder, a curing agent, and solvent on the surface of a nonmagnetic support;

a heating and drying step of drying the coating layer by means of a heat treatment; and a curing step of subjecting the coating layer to a curing treatment;

with a cooling step of cooling the coating layer being incorporated between the coating step and the heating and drying step; and a burnishing treatment step of subjecting the surface of the coating layer to a burnishing treatment being incorporated between the heating and drying step and the curing step.

The present inventors presume that implementing a cooling step and burnishing treatment step in the process of forming the backcoat layer of the above manufacturing method are desirable ways to keep the above-described logarithmic decrement to less than or equal to 0.060. The details are as set forth above. The present inventors presume that conducting a cooling step to cool the coating layer between the coating step and the heating and drying step can contribute to causing adhesive components that are released from the surface of the magnetic tape on the backcoat layer side during running to be locally present on the surface of the coating layer and/or in the outer layer portion in the vicinity of the surface. Although the reasons for this are unclear, the present inventors presume that cooling the coating layer of the backcoat layer-forming composition before the heating and drying step can facilitate migration of the adhesive components to the surface and/or outer layer portion of the coating layer during volatilization of the solvent in the heating and drying step. The present inventors presume that burnishing the surface of the coating layer on the surface of which and/or in the outer layer portion of which the adhesive components are locally present can remove the adhesive components. The present inventors presume that conducting a curing step after having thus removed the adhesive components relates to keeping the logarithmic decrement to less than or equal to 0.060. However, these are just presumptions and are not intended to limit the present invention in any way.

That is, an aspect of the present invention relates to a method of manufacturing the above magnetic tape including a backcoat layer-forming process, wherein the backcoat layer-forming process includes:

a coating step of forming a coating layer by coating a backcoat layer-forming composition containing nonmagnetic powder, binder, a curing agent, and solvent on the surface of a nonmagnetic support;

a heating and drying step of drying the coating layer by means of a heat treatment; and a curing step of subjecting the coating layer to a curing treatment;

with a cooling step of cooling the coating layer being incorporated between the coating step and the heating and drying step; and a burnishing treatment step of subjecting the surface of the coating layer to a burnishing treatment being incorporated between the heating and drying step and the curing step.

A specific embodiment of the above manufacturing method will be described based on FIG. 4. However, the present invention is not limited to the specific embodiment given below.

FIG. 4 is a process schematic showing a specific embodiment of the process of manufacturing a magnetic tape sequentially having a nonmagnetic layer and a magnetic layer on one surface of a nonmagnetic support and having a backcoat layer on the other surface of the nonmagnetic support. In the embodiment shown in FIG. 4, the operation of feeding a nonmagnetic support (long film) from a feeding part and winding it up on a winding part is continuously conducted. By conducting various treatments such as coating, drying, and orienting with the various parts and in the various zones shown in FIG. 4, it is possible to form a nonmagnetic layer and magnetic layer by sequential multilayer coating on one surface of a running nonmagnetic support and to form a backcoat layer on the other surface thereof. With the exception that a cooling zone is incorporated into the backcoat layer-forming step and a burnishing treatment step is incorporated before the curing treatment, this process can be conducted as the manufacturing process that is normally conducted to manufacture particulate magnetic recording media.

The nonmagnetic layer-forming composition that is being fed from the feeding part is coated by a first coating part on the nonmagnetic support to form a coating layer (nonmagnetic layer-forming composition coating step).

In a first heat treatment zone, the coating layer that has been formed is heated to dry it (heating and drying step). The heating and drying treatment can be conducted by passing the nonmagnetic support having a coating layer following the coating step through a hot atmosphere. The temperature of the hot atmosphere here is, for example, about 60° C. to 140° C. However, a temperature capable of drying the coating layer by volatilizing the solvent will suffice, and the temperature is not limited to the above range. A heated gas can optionally be blown onto the surface of the coating layer. These points can be also applied to the heating and drying step in the second heat treatment zone and heating and drying step in the third heat treatment zone set forth further below.

Next, in the second coating part, the magnetic layer-forming composition is coated on the surface of the nonmagnetic layer that has been formed by conducting the heating and drying step in the first heat treatment zone, forming a coating layer (magnetic layer forming-composition coating step).

Subsequently, while the coating layer of the magnetic layer-forming composition is still wet, an orientation treatment of the ferromagnetic powder in the coating layer is conducted in an orientation zone. Reference can be made to Japanese Unexamined Patent Publication (KOKAI) No. 2010-231843, paragraph 0067, with regard to the orientation treatment.

Following the orientation treatment, the coating layer is subjected to a heating and drying step in a second heating and drying zone.

Next, in a third coating part, a coating layer is formed by coating the backcoat layer-forming composition on the surface on the opposite side of the nonmagnetic support from that on which the nonmagnetic layer and magnetic layer have been formed (backcoat layer-forming composition coating step).

Following the above coating step, the coating layer of the backcoat layer-forming composition that has been formed in the coating step is cooled in a cooling zone (cooling step). For example, the cooling step can be conducted by passing the nonmagnetic support on which the above coating layers have been formed through a cooling atmosphere. The temperature of the cooling atmosphere desirably falls within a range of −10° C. to 0° C., preferably within a range of from −5° C. to 0° C. The duration of the cooling step (for example, the period from when some part of the coating layer is conveyed into the cooling zone until it is conveyed out (also referred to as the "residence time" hereinafter)) is not specifically limited. The longer it is made, the lower the logarithmic decrement value tends to become. Thus, if necessary, it is desirable to conduct preliminary tests and make adjustments so as to achieve a logarithmic decrement of less than or equal to 0.060. It is also possible to blow a cooled gas onto the coating surface in the coating step.

Subsequently, the coating layer following the cooling step is heat treated and dried in a third heat treatment zone.

In this manner, it is possible to obtain a magnetic tape sequentially having a nonmagnetic layer and a magnetic layer on one surface of a nonmagnetic support, and having a coating layer of the backcoat layer-forming composition that has been heated and dried on the other surface thereof. The magnetic tape thus obtained becomes a finished magnetic tape following the application of various treatments described below.

The magnetic tape that is obtained is wound up on a winding part and then cut (slit) to the size of a finished magnetic tape. The slitting can be conducted with a known cutting machine.

Prior to subjecting the slit magnetic tape to a curing treatment (heating, irradiation with light, or the like) corresponding to the type of curing agent contained in the backcoat layer-forming composition, the surface of the coating layer of the backcoat layer-forming composition that has been heated and dried is subjected to a burnishing treatment (burnishing treatment step between the heating and drying step and the curing step). The present inventors presume that the burnishing treatment can remove adhesive components that have migrated to the coated layer surface and/or outer layer portion that has been cooled in the cooling zone, and that this can be linked to keeping the logarithmic decrement to less than or equal to 0.060. However, as set forth above, this is merely a presumption, and is not intended to limit the present invention in any way.

The burnishing treatment is a treatment by which the surface being treated is rubbed by a member (such as a polishing tape or a grinding device such as a grinding blade or a grinding wheel), and can be conducted as burnishing treatments that are known in the manufacturing of particulate magnetic recording media. However, the burnishing treatment has not conventionally been conducted at a stage after the cooling step and heating and drying step but before the curing step. By contrast, conducting the burnishing treatment at this stage makes it possible to keep the logarithmic decrement to less than or equal to 0.060. This point has been discovered by the present inventors.

The burnishing treatment is desirably implemented by either rubbing with a polishing tape the surface of the coating layer being treated (polishing), or by grinding with a grinding apparatus the surface of the coating layer being treated (grinding), or by both. When the magnetic layer-forming composition contains an abrasive, it is desirable to employ a polishing tape containing at least one type of abrasive with a higher Mohs hardness than the abrasive. A polishing tape in the form of a commercial product can be employed, or a polishing tape fabricated by a known method can be employed. A grinding apparatus in the form of a known grinding blade, grinding wheel, or the like, such as a fixed blade, diamond wheel, or rotary blade, can be employed. The surface of the coating layer that has been rubbed with a polishing tape or ground with a grinding apparatus can be wiped with a wiping material. Reference can be made to Japanese Unexamined Patent Publication (KOKAI) Heisei No. 6-52544, paragraphs 0034 to 0048, FIG. 1, and Examples given in this publication, for details regarding desirable polishing tapes, grinding apparatus, burnishing treatments, and wiping treatments. The content of the above publication is expressly incorporated herein by reference in its entirety. The more intense the burnishing treatment adopted, the lower the value of the logarithmic decrement tends to be. The higher the degree of hardness of the abrasive contained in the polishing tape, the more the burnishing treatment can be intensified. The greater the quantity of abrasive in the polishing tape, the more the burnishing treatment can be intensified. And the higher the degree of hardness of the grinding apparatus that is employed, the more the burnishing treatment can be intensified. The greater the rate of sliding of the surface of the coating layer being treated against the member (such as a polishing tape or grinding apparatus), the more the burnishing treatment can be intensified. This sliding rate can be increased by increasing either the speed with which the member is displaced or the speed with which the magnetic tape being treated is displaced, or both.

Following the above burnishing treatment (burnishing treatment step), the coating layer of the backcoat layer-forming composition is subjected to a curing step. In the form shown in FIG. 4, the coating layer of the backcoat layer-forming composition is subjected to a surface-smoothing treatment after the burnishing treatment and before the curing treatment. The surface-smoothing treatment is a treatment that is conducted to increase the smoothness of the surface of the magnetic tape on the magnetic layer side and/or on the backcoat layer side, and is desirably conducted as a calendering treatment. Reference can be made to, for example, Japanese Unexamined Patent Publication (KOKAI) No. 2010-231843, paragraph 0026, for details regarding the calendering treatment.

Subsequently, the coating layer of the backcoat layer-forming composition is subjected to a curing treatment based on the type of curing agent contained in the coating layer (curing step). The curing treatment can be conducted as a treatment based on the type of curing agent contained in the coating layer, such as in the form of a heat treatment or irradiation with light. The curing treatment conditions are not specifically limited and can be suitably selected based on the formula of the backcoat layer-forming composition employed to form the coating layer, the type of curing agent, the thickness of the coating layer, or the like. For example, when forming a coating layer with a backcoat layer-forming composition containing polyisocyanate as curing agent, the curing treatment is desirably a heat treatment. When curing agent is contained in layers other than the backcoat layer, a curing reaction can be induced in those layers as well by this curing treatment. A separate curing step can also be provided. Following the curing step, the burnishing treatment can be conducted again.

A magnetic tape can be obtained that sequentially has a nonmagnetic layer and magnetic layer on one surface of a nonmagnetic support, has a backcoat layer on the other surface thereof, with a backcoat layer being less than or equal to 0.30 μm in thickness, and exhibits a logarithmic decrement as determined by a pendulum viscoelasticity test on the surface on the backcoat layer side of the magnetic tape of less than or equal to 0.060.

However, the above manufacturing method is merely an example. Any optional method permitting adjustment of the logarithmic decrement can be used to achieve a logarithmic decrement of less than or equal to 0.060, and such forms are covered by the present invention.

EXAMPLES

The present invention will be described in greater detail below through Examples. However, the present invention is not limited to the embodiments shown in Examples. The "parts" and "percent (%)" indicated below denote "weight parts" and "weight percent (%)" unless otherwise stated.

Examples 1 to 12, Comparative Examples 1 to 16

1. Preparation of Alumina Dispersion

To 100.0 parts of alumina powder with an alpha conversion rate of 65% and a BET specific surface area of 20 $m^2/g$ (HIT-80, made by Sumitomo Chemical Co., Ltd.) were admixed 3.0 parts of 2,3-dihydroxynaphthalene (made by Tokyo Chemical Industry Co., Ltd.), 31.3 parts of a 32% solution (in a mixed solvent of methyl ethyl ketone and toluene) of polyester polyurethane resin (UR-4800 made by Toyobo (Japanese registered trademark) containing polar groups in the form of $SO_3Na$ groups (polar group content: 80 meq/kg)), and 570.0 parts of solvent in the form of a 1:1 (by weight) mixed solution of methyl ethyl ketone and cyclohexanone. The mixture was then dispersed for 5 hours in a paint shaker in the presence of zirconia beads. Following dispersion, the dispersion and beads were separated with a mesh, yielding an alumina dispersion.

2. Formula of Magnetic Layer-Forming Composition (Magnetic liquid)

| | |
|---|---|
| Ferromagnetic powder: | 100.0 parts |
| Ferromagnetic hexagonal barium ferrite powder or ferromagnetic metal powder (see Table 1) | |
| $SO_3Na$ group-containing polyurethane resin | 14.0 parts |
| Weight average molecular weight: 70,000, $SO_3Na$ groups: 0.2 meq/g | |

-continued

| | |
|---|---|
| Cyclohexanone | 150.0 parts |
| Methyl ethyl ketone | 150.0 parts |
| (Abrasive liquid) | |
| Alumina dispersion prepared in 1. above | 6.0 parts |
| (silica sol) | |
| Colloidal silica (average particle size: 120 nm) | 2.0 parts |
| Methyl ethyl ketone | 1.4 parts |
| (Other components) | |
| Stearic acid | 2.0 parts |
| Amide stearate | 0.2 part |
| Butyl stearate | 2.0 parts |
| Polyisocyanate (Coronate (Japanese registered trademark) L made by Nippon Polyurethane Industry Co., Ltd.) | 2.5 parts |
| (Finishing solvents) | |
| Cyclohexanone | 200.0 parts |
| Methyl ethyl ketone | 200.0 parts |

In Table 1, BF denotes ferromagnetic hexagonal barium ferrite powder with an average particle size (average plate diameter) of 21 nm and MP denotes ferromagnetic metal powder with an average particle size (average major axis length) of 30 nm.

3. Formula of Nonmagnetic Layer-Forming Composition

| | |
|---|---|
| Nonmagnetic inorganic oxide powder: α-iron oxide | 100.0 parts |
| Average particle size (average major axis length): 0.15 μm | |
| Average acicular ratio: 7 | |
| BET specific surface area: 52 m²/g | |
| Carbon black | 20.0 parts |
| Average particle size: 20 nm | |
| SO₃Na group-containing polyurethane resin | 18.0 parts |
| (weight average molecular weight: 70,000, SO₃Na groups: 0.2 meq/g) | |
| Stearic acid | 2.0 parts |
| Amide stearate | 0.2 part |
| Butyl stearate | 2.0 parts |
| Cyclohexanone | 300.0 parts |
| Methyl ethyl ketone | 300.0 parts |

4. Formula of Backcoat Layer-Forming Composition

| | |
|---|---|
| Nonmagnetic inorganic oxide powder: α-iron oxide | See Table 1 |
| Average particle size (average major axis length): 0.15 μm | |
| Average acicular ratio: 7 | |
| BET specific surface area: 52 m²/g | |
| Carbon black | See Table 1 |
| Average particle size: 20 nm | |
| Vinyl chloride copolymer | See Table 1 |
| Sulfonate group-containing polyurethane resin | See Table 1 |
| Phenylphosphonic acid | See Table 1 |
| Stearic acid | See Table 1 |
| Amide stearate | See Table 1 |
| Butyl stearate | See Table 1 |
| Cyclohexanone | 155.0 parts |
| Methyl ethyl ketone | 155.0 parts |
| Polyisocyanate (Coronate L made by Nippon Polyurethane Industry Co., Ltd.) | 5.0 parts |
| Cyclohexanone | 200.0 parts |

5. Preparation of Various Layer-Forming Compositions

A magnetic layer-forming composition was prepared by the following method. The above magnetic liquid was prepared by dispersing (bead dispersing) the various components in a batch-type vertical sand mill for 24 hours. Zirconia beads with a bead diameter of 0.5 mmΦ were employed as dispersing beads. Using this sand mill, the magnetic liquid that had been prepared and the abrasive liquid were admixed with the other components (silica sol, other components, and finishing solvents) and the mixture was bead dispersed for 5 minutes. The mixture was then processed for 0.5 minutes (ultrasonic dispersion) in a batch-type ultrasonic device (20 kHz, 300 W). Subsequently, a filter with an average pore diameter of 0.5 μm was employed to filter the mixture, yielding a magnetic layer-forming composition.

A nonmagnetic layer-forming composition was prepared by the following method. Excluding the lubricants (stearic acid, amide stearate, butyl stearate), cyclohexanone, and methyl ethyl ketone, the various components were dispersed for 24 hours in a batch-type vertical sand mill to obtain a dispersion. Zirconia beads with a bead diameter of 0.5 mmΦ were employed as dispersing beads. Subsequently, the remaining components were added to the dispersion that had been obtained and the mixture was stirred in a dissolver. The dispersion thus obtained was filtered with a filter having an average pore diameter of 0.5 μm, yielding a nonmagnetic layer-forming composition.

A backcoat layer-forming composition was prepared by the following method. Excluding the polyisocyanate and cyclohexanone, the various components were kneaded and diluted in an open kneader. Subsequently, in a horizontal bead mill dispersing device, 12 passes of dispersion processing were conducted, each pass having a residence time of 2 minutes, using zirconia beads with a bead diameter of 1 mmΦ at a bead fill rate of 80 volume % and a rotor tip peripheral speed of 10 m/s. Subsequently, the remaining components were added to the dispersion that had been obtained and the mixture was stirred in a dissolver. The dispersion thus obtained was filtered with a filter having an average pore diameter of 1 μm, yielding a backcoat layer-forming composition.

6. Fabricating Magnetic Tapes

Magnetic tapes were fabricated in the specific form shown in FIG. 4. The details are as follows.

A polyethylene naphthalate support of the thickness given in Table 1 was fed from a feeding part and the nonmagnetic layer-forming composition prepared in 5, above was coated on one of the surfaces in a first coating part in a quantity calculated to yield the thickness given in Table 1 upon drying. Next, the support upon which the coating layer had been formed was passed through a first heat treatment zone with an atmospheric temperature of 100° C. in a heating and drying step to form a nonmagnetic layer.

Subsequently, in a second coating part, the magnetic layer-forming composition prepared in 5, above was coated over the surface of the nonmagnetic layer in a quantity calculated to yield the thickness given in Table 1 upon drying to form a coating layer. While this coating layer was still wet, a magnetic field with a field strength of 0.3 T was applied in a direction perpendicular to the surface of the coating layer of the magnetic layer-forming composition in an orientation zone to conduct a perpendicular orientation treatment. Subsequently drying was conducted in a second heat treatment zone (atmospheric temperature: 100° C.).

In a third coating part, the backcoat layer-forming composition prepared in 5, above was coated on the opposite surface of the polyethylene naphthalate support from the surface on which the nonmagnetic layer and magnetic layer had been formed in a quantity calculated to yield the thickness given in Table 1 upon drying, thereby forming a coating layer on the surface of the nonmagnetic support. While the coating layer that had been formed was still wet, it was passed for the residence time indicated in Table 1 through a cooling zone that had been adjusted to an atmospheric temperature of 0° C., after which the coating layer was dried in a third heat treatment zone (atmospheric temperature 100° C.).

The magnetic tape thus obtained was slit to a width of ½ inch (0.0127 meter), after which the surface of the coating layer of the backcoat layer-forming composition was subjected to a burnishing treatment and wiping treatment. The burnishing treatment and wiping treatment were conducted with a processing device configured as set forth in FIG. 1 of Japanese Unexamined Patent Publication (KOKAI) Heisei No. 6-52544 employing a polishing tape in the form of a commercial polishing tape (product name MA22000 made by Fujifilm, abrasive: diamond/$Cr_2O_3$/red iron oxide), a grinding blade in the form of a commercial sapphire blade (made by Kyocera Corp., width 5 mm, length 35 mm, tip angle 60 degrees), and a wiping material in the form of a commercial wiping material (product name WRP736, made by Kuraray Co., Ltd.). The processing conditions of Example 12 in Japanese Unexamined Patent Publication (KOKAI) Heisei No. 6-52544 were adopted as processing conditions.

Following the burnishing treatment and wiping treatment, a calendering treatment (surface-smoothing treatment) was conducted with a calender comprised solely of metal rolls at a rate of 80 m/min, a linear pressure of 300 kg/cm, and a calender temperature of 100° C. (calender roll surface temperature).

Subsequently, a curing treatment (heat treatment) was conducted for 36 hours in an environment with an atmospheric temperature of 70° C. to obtain a magnetic tape.

In the comparative examples for which "0 s" (0 second) has been entered in the cooling zone residence time column in Table 1, magnetic tapes were fabricated by a manufacturing process that did not incorporate a cooling zone.

In the comparative examples for which "Not implemented" has been entered in the burnishing treatment before curing step column, magnetic tapes were fabricated by a manufacturing process in which no burnishing treatment or wiping treatment was conducted in the steps before implementing the curing treatment. However, in Comparative Example 16, the above burnishing treatment and wiping treatment were conducted after the curing treatment.

The magnetic tapes of Examples and Comparative Examples were fabricated by the process set forth above.

The thickness of each of the layers and of the nonmagnetic support, as well as the total thickness of the magnetic tapes fabricated were determined by the following method. The thickness of each of the layers formed was confirmed to be the thickness given in Table 1.

A cross-section in the direction of thickness of the magnetic tape was exposed with an ion beam, after which the exposed cross-section was observed by a scanning electron microscope. The arithmetic average of the thickness as determined at two spots in the direction of thickness by observation of the cross-section was adopted for the various thicknesses.

[Evaluation Methods]

1. Measurement of Logarithmic Decrement

An RPT-3000W rigid-body pendulum-type physical property-testing instrument made by A&D Co., Ltd. (pendulum: made of brass; substrate: glass substrate; rate of substrate temperature increase: 5° C./min) was employed as the measurement device to determine the logarithmic decrements of the surfaces on the backcoat layer sides (backcoat layer surfaces) of the magnetic tapes of Examples and Comparative Examples by the method set forth above. A measurement sample that was cut out of the magnetic tape of each of Examples or Comparative Examples was placed on a glass substrate about 3 cm×about 5 cm in size and secured in four spots with immobilizing tape (Kapton tape, made by Du Pont-Toray Co., Ltd.) as shown in FIG. 1. An attraction time of 1 second and a measurement interval of 7 to 10 seconds were employed, and a displacement-time curve was plotted for the 86th measurement interval. This curve was used to determine the logarithmic decrement. Measurements were conducted in an environment with a relative humidity of about 50%.

2. Missing Pulse Occurrence Frequency

Magnetic tape cartridges housing the various magnetic tapes (total length of magnetic tapes: 500 m) of Examples and Comparative Examples were placed in a Linear Tape-Open Generation 6 (LTO-G6) drive made by IBM and the magnetic tapes were run back and forth 1,500 times at a running speed of 5 m/s and a tension of 0.6 N.

Following running, the magnetic tape cartridge was placed in a reference drive (LTO-G6 drive made by IBM) and the magnetic tape was run to conduct recording and reproduction. An external analog/digital (AD) converter picked up the reproduction signal during running. A signal in which the amplitude of the reproduction signal dropped 70% or more relative to the average (average of the measurement value of the entire track) was deemed a missing pulse. The occurrence frequency (number of occurrences) was divided by the total length of the magnetic tape to obtain the missing pulse occurrence frequency (referred to hereinafter as the "missing pulse occurrence frequency" (unit: missing pulses/m) per unit length of magnetic tape (per meter). The results are given in Table 1. A magnetic tape with a missing pulse occurrence frequency of less than or equal to 5.0 missing pulses/m was determined to be highly reliable in practical terms.

The results are given in Table 1.

TABLE 1

|  | Ex. 1 | Ex. 2 | Ex. 3 | Ex. 4 | Ex. 5 | Ex. 6 |
| --- | --- | --- | --- | --- | --- | --- |
| Ferromagnetic powder | BF | BF | BF | BF | MP | BF |
| Magnetic layer thickness | 0.10 μm | 0.10 μm | 0.10 μm | 0.10 μm | 0.10 μm | 0.10 μm |
| Nonmagnetic layer thickness | 1.00 μm | 1.00 μm | 1.00 μm | 1.00 μm | 1.00 μm | 1.00 μm |

TABLE 1-continued

| | | | | | | | |
|---|---|---|---|---|---|---|---|
| Nonmagnetic support thickness | | 4.30 μm | 4.30 μm | 4.30 μm | 4.30 μm | 4.30 μm | 4.30 μm |
| Backcoat layer thickness | | 0.30 μm | 0.30 μm | 0.30 μm | 0.30 μm | 0.30 μm | 0.30 μm |
| Magnetic tape total thickness | | 5.70 μm | 5.70 μm | 5.70 μm | 5.70 μm | 5.70 μm | 5.70 μm |
| Backcoat layer-forming composition | α-iron oxide/parts | 80.0 | 80.0 | 80.0 | 80.0 | 80.0 | 50.0 |
| | Carbon black/parts | 20.0 | 20.0 | 20.0 | 20.0 | 20.0 | 50.0 |
| | Vinyl chloride copolymer/parts | 13.0 | 13.0 | 13.0 | 13.0 | 13.0 | 13.0 |
| | Sulfonate group-containing polyurethane resin/parts | 6.0 | 6.0 | 6.0 | 6.0 | 6.0 | 6.0 |
| | Phenylphosphonic acid/parts | 3.0 | 3.0 | 3.0 | 3.0 | 3.0 | 3.0 |
| | Stearic acid/parts | 2.0 | 2.0 | 2.0 | 2.0 | 2.0 | 2.0 |
| | Amide stearate/parts | 0.2 | 0.2 | 0.2 | 0.2 | 0.2 | 0.2 |
| | Butyl stearate/parts | 2.0 | 2.0 | 2.0 | 2.0 | 2.0 | 2.0 |
| Cooling zone residence time | | 1 s | 60 s | 180 s | 240 s | 1 s | 1 s |
| Burnishing treatment before curing step | | Implemented | Implemented | Implemented | Implemented | Implemented | Implemented |
| Logarithmic decrement on the surface on the backcoat layer side of the magnetic tape | | 0.058 | 0.047 | 0.031 | 0.015 | 0.058 | 0.055 |
| Missing pulse occurrence frequency (missing pulses/m) | | 3.1 | 2.4 | 2.2 | 1.9 | 3.4 | 2.9 |

| | | Ex. 7 | Ex. 8 | Ex. 9 | Ex. 10 | Ex. 11 | Ex. 12 |
|---|---|---|---|---|---|---|---|
| Ferromagnetic powder | | BF | BF | BF | BF | BF | BF |
| Magnetic layer thickness | | 0.10 μm | 0.10 μm | 0.10 μm | 0.10 μm | 0.10 μm | 0.10 μm |
| Nonmagnetic layer thickness | | 1.00 μm | 1.00 μm | 1.00 μm | 1.00 μm | 1.00 μm | 1.00 μm |
| Nonmagnetic support thickness | | 4.30 μm | 4.30 μm | 4.30 μm | 4.30 μm | 4.30 μm | 4.30 μm |
| Backcoat layer thickness | | 0.30 μm | 0.30 μm | 0.30 μm | 0.30 μm | 0.20 μm | 0.10 μm |
| Magnetic tape total thickness | | 5.70 μm | 5.70 μm | 5.70 μm | 5.70 μm | 5.60 μm | 5.50 μm |
| Backcoat layer-forming composition | α-iron oxide/parts | 0.0 | 80.0 | 80.0 | 80.0 | 80.0 | 80.0 |
| | Carbon black/parts | 100.0 | 20.0 | 20.0 | 20.0 | 20.0 | 20.0 |
| | Vinyl chloride copolymer/parts | 13.0 | 20.0 | 8.0 | 13.0 | 13.0 | 13.0 |
| | Sulfonate group-containing polyurethane resin/parts | 6.0 | 10.0 | 3.0 | 6.0 | 6.0 | 6.0 |
| | Phenylphosphonic acid/parts | 3.0 | 3.0 | 3.0 | 3.0 | 3.0 | 3.0 |
| | Stearic acid/parts | 2.0 | 2.0 | 2.0 | 1.0 | 2.0 | 2.0 |
| | Amide stearate/parts | 0.2 | 0.2 | 0.2 | 0.1 | 0.2 | 0.2 |
| | Butyl stearate/parts | 2.0 | 2.0 | 2.0 | 1.0 | 2.0 | 2.0 |
| Cooling zone residence time | | 1 s | 1 s | 1 s | 1 s | 1 s | 1 s |
| Burnishing treatment before curing step | | Implemented | Implemented | Implemented | Implemented | Implemented | Implemented |
| Logarithmic decrement on the surface on the backcoat layer side of the magnetic tape | | 0.054 | 0.055 | 0.055 | 0.055 | 0.058 | 0.058 |
| Missing pulse occurrence frequency (missing pulses/m) | | 3.0 | 3.0 | 3.1 | 2.9 | 3.0 | 2.8 |

| | | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Ferromagnetic powder | | BF | BF | BF | BF | BF | BF |
| Magnetic layer thickness | | 0.10 μm | 0.10 μm | 0.10 μm | 0.10 μm | 0.10 μm | 0.10 μm |
| Nonmagnetic layer thickness | | 1.00 μm | 1.00 μm | 1.00 μm | 1.00 μm | 1.00 μm | 1.00 μm |
| Nonmagnetic support thickness | | 4.30 μm | 4.30 μm | 4.30 μm | 4.30 μm | 4.30 μm | 4.30 μm |
| Backcoat layer thickness | | 0.60 μm | 0.50 μm | 0.40 μm | 0.30 μm | 0.20 μm | 0.10 μm |
| Magnetic tape total thickness | | 6.00 μm | 5.90 μm | 5.80 μm | 5.70 μm | 5.60 μm | 5.50 μm |
| Backcoat layer-forming composition | α-iron oxide/parts | 80.0 | 80.0 | 80.0 | 80.0 | 80.0 | 80.0 |
| | Carbon black/parts | 20.0 | 20.0 | 20.0 | 20.0 | 20.0 | 20.0 |
| | Vinyl chloride copolymer/parts | 13.0 | 13.0 | 13.0 | 13.0 | 13.0 | 13.0 |
| | Sulfonate group-containing polyurethane resin/parts | 6.0 | 6.0 | 6.0 | 6.0 | 6.0 | 6.0 |
| | Phenylphosphonic acid/parts | 3.0 | 3.0 | 3.0 | 3.0 | 3.0 | 3.0 |
| | Stearic acid/parts | 2.0 | 2.0 | 2.0 | 2.0 | 2.0 | 2.0 |
| | Amide stearate/parts | 0.2 | 0.2 | 0.2 | 0.2 | 0.2 | 0.2 |
| | Butyl stearate/parts | 2.0 | 2.0 | 2.0 | 2.0 | 2.0 | 2.0 |
| Cooling zone residence time | | 0 s | 0 s | 0 s | 0 s | 0 s | 0 s |
| Burnishing treatment before curing step | | Not implemented | Not implemented | Not implemented | Not implemented | Not implemented | Not implemented |
| Logarithmic decrement on the surface on the backcoat layer side of the magnetic tape | | 0.071 | 0.071 | 0.071 | 0.071 | 0.071 | 0.071 |
| Missing pulse occurrence frequency (missing pulses/m) | | 2.3 | 2.4 | 2.6 | 5.3 | 6.6 | 9.0 |

| | | Comp. Ex. 7 | Comp. Ex. 8 | Comp. Ex. 9 | Comp. Ex. 10 | Comp. Ex. 11 |
|---|---|---|---|---|---|---|
| Ferromagnetic powder | | MP | BF | BF | BF | BF |
| Magnetic layer thickness | | 0.10 μm | 0.10 μm | 0.10 μm | 0.10 μm | 0.10 μm |
| Nonmagnetic layer thickness | | 1.00 μm | 1.00 μm | 1.00 μm | 1.00 μm | 1.00 μm |

TABLE 1-continued

| | | | | | | |
|---|---|---|---|---|---|---|
| Nonmagnetic support thickness | | 4.30 μm | 4.30 μm | 4.30 μm | 4.30 μm | 4.30 μm |
| Backcoat layer thickness | | 0.30 μm | 0.30 μm | 0.30 μm | 0.30 μm | 0.30 μm |
| Magnetic tape total thickness | | 5.70 μm | 5.70 μm | 5.70 μm | 5.70 μm | 5.70 μm |
| Backcoat layer-forming composition | α-iron oxide/parts | 80.0 | 80.0 | 80.0 | 80.0 | 50.0 |
| | Carbon black/parts | 20.0 | 20.0 | 20.0 | 20.0 | 50.0 |
| | Vinyl chloride copolymer/parts | 13.0 | 13.0 | 13.0 | 13.0 | 13.0 |
| | Sulfonate group-containing polyurethane resin/parts | 6.0 | 6.0 | 6.0 | 6.0 | 6.0 |
| | Phenylphosphonic acid/parts | 3.0 | 3.0 | 3.0 | 3.0 | 3.0 |
| | Stearic acid/parts | 2.0 | 2.0 | 2.0 | 2.0 | 2.0 |
| | Amide stearate/parts | 0.2 | 0.2 | 0.2 | 0.2 | 0.2 |
| | Butyl stearate/parts | 2.0 | 2.0 | 2.0 | 2.0 | 2.0 |
| Cooling zone residence time | | 0 s | 1 s | 60 s | 0 s | 0 s |
| Burnishing treatment before curing step | | Not implemented | Not implemented | Not implemented | Implemented | Not implemented |
| Logarithmic decrement on the surface on the backcoat layer side of the magnetic tape | | 0.071 | 0.077 | 0.088 | 0.069 | 0.069 |
| Missing pulse occurrence frequency (missing pulses/m) | | 9.4 | 12.1 | 14.4 | 5.3 | 5.2 |

| | | Comp. Ex. 12 | Comp. Ex. 13 | Comp. Ex. 14 | Comp. Ex. 15 | Comp. Ex. 16 |
|---|---|---|---|---|---|---|
| Ferromagnetic powder | | BF | BF | BF | BF | BF |
| Magnetic layer thickness | | 0.10 μm | 0.10 μm | 0.10 μm | 0.10 μm | 0.10 μm |
| Nonmagnetic layer thickness | | 1.00 μm | 1.00 μm | 1.00 μm | 1.00 μm | 1.00 μm |
| Nonmagnetic support thickness | | 4.30 μm | 4.30 μm | 4.30 μm | 4.30 μm | 4.30 μm |
| Backcoat layer thickness | | 0.30 μm | 0.30 μm | 0.30 μm | 0.30 μm | 0.30 μm |
| Magnetic tape total thickness | | 5.70 μm | 5.70 μm | 5.70 μm | 5.70 μm | 5.70 μm |
| Backcoat layer-forming composition | α-iron oxide/parts | 0.0 | 80.0 | 80.0 | 80.0 | 80.0 |
| | Carbon black/parts | 100.0 | 20.0 | 20.0 | 20.0 | 20.0 |
| | Vinyl chloride copolymer/parts | 13.0 | 20.0 | 8.0 | 13.0 | 13.0 |
| | Sulfonate group-containing polyurethane resin/parts | 6.0 | 10.0 | 3.0 | 6.0 | 6.0 |
| | Phenylphosphonic acid/parts | 3.0 | 3.0 | 3.0 | 3.0 | 3.0 |
| | Stearic acid/parts | 2.0 | 2.0 | 2.0 | 1.0 | 2.0 |
| | Amide stearate/parts | 0.2 | 0.2 | 0.2 | 0.1 | 0.2 |
| | Butyl stearate/parts | 2.0 | 2.0 | 2.0 | 1.0 | 2.0 |
| Cooling zone residence time | | 0 s | 0 s | 0 s | 0 s | 0 s |
| Burnishing treatment before curing step | | Not implemented | Not implemented | Not implemented | Not implemented | Not implemented (Burnishing treatment was implemented after curing step.) |
| Logarithmic decrement on the surface on the backcoat layer side of the magnetic tape | | 0.073 | 0.073 | 0.071 | 0.069 | 0.071 |
| Missing pulse occurrence frequency (missing pulses/m) | | 5.6 | 5.5 | 5.2 | 5.1 | 5.3 |

Based on the results in Table 1, the following points were confirmed.

(1) In the magnetic tapes of Comparative Examples 1 to 3 in which the thickness of the backcoat layer exceeded 0.30 μm, the missing pulse occurrence frequency was less than or equal to 5.0 missing pulses/m even when the logarithmic decrement of the surface on the backcoat layer side exceeded 0.060. That is, in magnetic tapes in which the backcoat layer thickness exceeded 0.30 μm, no correlation was observed between the missing pulse occurrence frequency and the logarithmic decrement of the surface on the backcoat layer side.

(2) By contrast, based on a comparison of Examples 1 to 12 and Comparative Examples 4 to 16, in magnetic tapes in which the backcoat layer thickness was less than or equal to 0.30 μm, a logarithmic decrement of the surface on the backcoat layer side of less than or equal to 0.060 was determined to lower the missing pulse occurrence frequency.

An aspect of the present invention is useful in the technical field of magnetic tapes such as backup tapes.

Although the present invention has been described in considerable detail with regard to certain versions thereof, other versions are possible, and alterations, permutations and equivalents of the version shown will become apparent to those skilled in the art upon a reading of the specification. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic tape,
which comprises a magnetic layer comprising ferromagnetic powder and binder on a surface on one side of a nonmagnetic support and comprises a backcoat layer comprising nonmagnetic powder and binder on a surface on the other side of the nonmagnetic support, wherein:
the backcoat layer is less than or equal to 0.30 μm in thickness; and
the logarithmic decrement as determined by a pendulum viscoelasticity test on a surface on the backcoat layer side of the magnetic tape is greater than or equal to 0.010 but less than or equal to 0.060, and
the logarithmic decrement is determined by the following method:
securing a measurement sample of the magnetic tape with the measurement surface, which is the surface on the backcoat layer side, facing upward on a substrate in a pendulum viscoelasticity tester;
disposing a columnar cylinder edge which is 4 mm in diameter and equipped with a pendulum 13 g in weight on the measurement surface of the measurement sample such that the long axis direction of the columnar cylinder edge runs parallel to the longitudinal direction of the measurement sample;
raising the surface temperature of the substrate on which the measurement sample has been positioned at a rate of less than or equal to 5° C./min up to 80° C.;
inducing initial oscillation of the pendulum;
monitoring the displacement of the pendulum while it is oscillating to obtain a displacement-time curve for a measurement interval of greater than or equal to 10 minutes; and
obtaining the logarithmic decrement Δ from the following equation:

$$\Delta = \frac{\ln\left(\frac{A_1}{A_2}\right) + \ln\left(\frac{A_2}{A_3}\right) + \ldots \ln\left(\frac{A_n}{A_{n+1}}\right)}{n}$$

wherein the interval from one minimum displacement to the next minimum displacement is adopted as one wave period; the number of waves contained in the displacement-time curve during one measurement interval is denoted by n, the difference between the minimum displacement and the maximum displacement of the $n^{th}$ wave is denoted by An, and the logarithmic decrement is calculated using the difference between the next minimum displacement and maximum displacement of the $n^{th}$ wave ($A_{n+1}$ in the above equation).

2. The magnetic tape according to claim 1,
wherein the logarithmic decrement as determined by a pendulum viscoelasticity test on a surface on the backcoat layer side of the magnetic tape is greater than or equal to 0.010 but less than or equal to 0.050.

3. The magnetic tape according to claim 2,
wherein the nonmagnetic powder contained in the backcoat layer is selected from the group consisting of carbon black and nonmagnetic inorganic oxide powder.

4. The magnetic tape according to claim 2,
which comprises a nonmagnetic layer comprising nonmagnetic powder and binder between the magnetic layer and the nonmagnetic support.

5. The magnetic tape according to claim 1,
wherein the nonmagnetic powder contained in the backcoat layer is selected from the group consisting of carbon black and nonmagnetic inorganic oxide powder.

6. A method of manufacturing a magnetic tape,
wherein the magnetic tape is a magnetic tape which comprises a magnetic layer comprising ferromagnetic powder and binder on a surface on one side of a nonmagnetic support and comprises a backcoat layer comprising nonmagnetic powder and binder on a surface on the other side of the nonmagnetic support, wherein:
the backcoat layer is less than or equal to 0.30 μm in thickness; and
the logarithmic decrement as determined by a pendulum viscoelasticity test on a surface on the backcoat layer side of the magnetic tape according to the method recited in claim 1 is greater than or equal to 0.010 but less than or equal to 0.060, and
the method of manufacturing the magnetic tape comprises forming a backcoat layer, with the forming of a backcoat layer comprising:
coating a backcoat layer-forming composition comprising nonmagnetic powder, binder, a curing agent, and solvent on a surface of a nonmagnetic support to form a coating layer;
heating and drying the coating layer by a heat treatment; and
curing the coating layer by subjecting the coating layer to a curing treatment;
with cooling the coating layer after the coating but before the heating and drying; and
burnishing a surface of the coating layer after the heating and drying but before the curing.

7. The method of manufacturing a magnetic tape according to claim 6,
wherein the cooling is conducted by placing the coating layer in a cooling atmosphere of −10° C. to 0° C.

8. The method of manufacturing a magnetic tape according to claim 7,
wherein the solvent contained in the backcoat layer-forming composition comprises ketone solvent.

9. The method of manufacturing a magnetic tape according to claim 6,
wherein the solvent contained in the backcoat layer-forming composition comprises ketone solvent.

10. The method of manufacturing a magnetic tape according to claim 6,
wherein the curing agent is a thermosetting compound and the curing is conducted by a heat treatment.

11. The method of manufacturing a magnetic tape according to claim 10,
wherein the thermosetting compound is polyisocyanate.

12. The method of manufacturing a magnetic tape according to claim 6,
wherein the logarithmic decrement as determined by a pendulum viscoelasticity test on a surface on the backcoat layer side of the magnetic tape is greater than or equal to 0.010 but less than or equal to 0.050.

13. The method of manufacturing a magnetic tape according to claim 12,
wherein the nonmagnetic powder contained in the backcoat layer is selected from the group consisting of carbon black and nonmagnetic inorganic oxide powder.

14. The method of manufacturing a magnetic tape according to claim 6, wherein the nonmagnetic powder contained in the back-coat layer is selected from the group consisting of carbon black and nonmagnetic inorganic oxide powder.

15. The method of manufacturing a magnetic tape according to claim 6,
wherein the magnetic tape comprises a nonmagnetic layer comprising nonmagnetic powder and binder between the magnetic layer and the nonmagnetic support.

* * * * *